United States Patent [19]
Farrow

[11] Patent Number: 4,513,363
[45] Date of Patent: Apr. 23, 1985

[54] STRUCTURE FOR AND METHOD OF REDUCING IMPEDANCE IN MULTIPHASE DIRECT CURRENT POWER SUPPLIES

[75] Inventor: John F. Farrow, Plymouth, Mich.

[73] Assignee: Medar, Inc., Farmington Hills, Mich.

[21] Appl. No.: 350,987

[22] Filed: Feb. 22, 1982

[51] Int. Cl.³ .............................................. H02M 7/06
[52] U.S. Cl. ..................................... 363/126; 363/70
[58] Field of Search .................... 363/64, 67, 69–70, 363/126, 129; 318/771

[56] References Cited

U.S. PATENT DOCUMENTS

| | | | |
|---|---|---|---|
| 2,905,882 | 9/1959 | Koppelmann | 363/69 |
| 3,471,767 | 10/1969 | Parrish et al. | 363/70 |

FOREIGN PATENT DOCUMENTS

| | | | |
|---|---|---|---|
| 0366326 | 2/1963 | Switzerland | 363/70 |
| 0699503 | 11/1979 | U.S.S.R. | 363/70 |
| 0714591 | 2/1980 | U.S.S.R. | 363/70 |

Primary Examiner—Peter S. Wong
Attorney, Agent, or Firm—Barnes, Kisselle, Raisch, Choate, Whittemore & Hulbert

[57] ABSTRACT

Structure for and method of eliminating impedance in multiphase direct current power supplies comprising connecting transformer primary windings in Y configuration with contactor structure, whereby multiple impedance paths through transformer secondary circuits are provided.

19 Claims, 4 Drawing Figures

STRUCTURE FOR AND METHOD OF REDUCING IMPEDANCE IN MULTIPHASE DIRECT CURRENT POWER SUPPLIES

BACKGROUND OF THE INVENTION

1. Field of the Invention

The invention relates to multiphase direct current power supplies and refers more particularly to such power supplies wherein the power supply secondary circuit impedance is reduced through a Y connection of the primary circuit transformer primary windings whereby current through the secondary circuit of the power supply is split between multiple diode paths.

2. Description of the Prior Art

In the past, large three-phase direct current power supplies for example might have an open circuit, that is zero current output voltage, of approximately 19 volts. At 100,000 amperes, such output voltage may drop to approximately 8 volts. Thus, approximately 11 volts may be dropped inside such power supply.

In an effort to improve the efficiency of such power supplies, and on investigation it has been found that the power supply transformers have a 7% impedance factor. That is, the voltage output of the transformers drops approximately 7% from a no-load to a full-load condition. Using this factor, the transformers themselves contribute approximately 1.5 volts to the total internal voltage drop of such power supplies.

It is usual in such power supplies to have six sets of ten diodes each in parallel in the power supply secondary circuit. Such a circuit is referred to as a 6-phase star. With the usual connection of prior power supply circuits, one set of ten diodes is conducting the full output current at any time. Therefore, each diode of a set when conducting may conduct 10,000 amperes. Manufacturer's information for such diodes indicates that the voltage drop across such diodes increases from approximately 0.5 volts at low currents to 1.5 volts at 10,000 amps. Therefore, the voltage drop through the diodes accounts for approximately 1.5 volts of the total internal voltage drop of such three-phase direct current power supplies.

With such prior power supplies, the analysis of the copper cross section area of the internal buses of the power supply indicates that the voltage drop due to the resistance of the copper is normally less than 0.5 volts.

Thus, the voltage drop through the transformers of such power supplies, and the copper and diodes thereof, account for about 3½ volts of the total 11 volt drop in such power supplies. Most of the remaining voltage drop comes from inductance. That is, the conductors carrying current from the transformers through the diodes to the output of the power supply have inductance. Since each diode set transitions from non-conducting to conducting, in the operation of the power supply, the inductance resists the flow of current.

Inductance in this area shows up as a non-unity power factor in the primary of the transformers. Additional open circuit transformer voltage is needed to overcome this inductance which results in a higher primary current demand for a given secondary current.

With reference to the prior art, connection of the primary circuit of three-phase direct current power supplies as considered above, areas are noted where power supply impedance may be improved.

Thus, due to the delta configuration of the transformer primary windings shown in FIG. 1, only one transformer winding at any instant of time is conducting. This means that only one set of diodes in the secondary circuit of the power supply will be conducting at any time. Therefore, the entire current of a power supply with transformer primary windings connected as shown in FIG. 1 has to flow through the impedance provided by one transformer, one diode set, and the associated conductors. Despite the fact that there are six possible current paths through the power supply, one through each diode set, there has been no use made of any possible parallel current paths to reduce the internal impedance of prior multiphase direct current power supplies.

SUMMARY OF THE INVENTION

In accordance with the invention, the primary circuit of a multiphase direct current power supply is connected with the primary windings of the transformers thereof in a Y configuration. Contactors are placed between the inner ends of the transformer primary windings or in series with the incoming three-phase power line so that all current flow is through two transformer primaries in series at all times. As a result, current is flowing in two of the secondary circuits simultaneously, and therefore through two sets of diodes and associated circuitry in parallel, thereby reducing most impedances by one half, thus allowing more efficient operation.

DESCRIPTION OF THE PREFERRED EMBODIMENT

Figure 2:
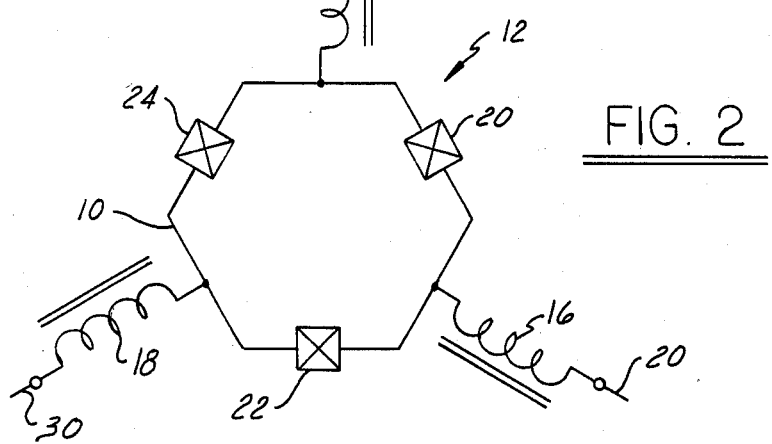
FIG. 2 is a schematic diagram of the primary circuit of one modification of a three-phase direct current power supply constructed in accordance with the invention.
Figure 4:
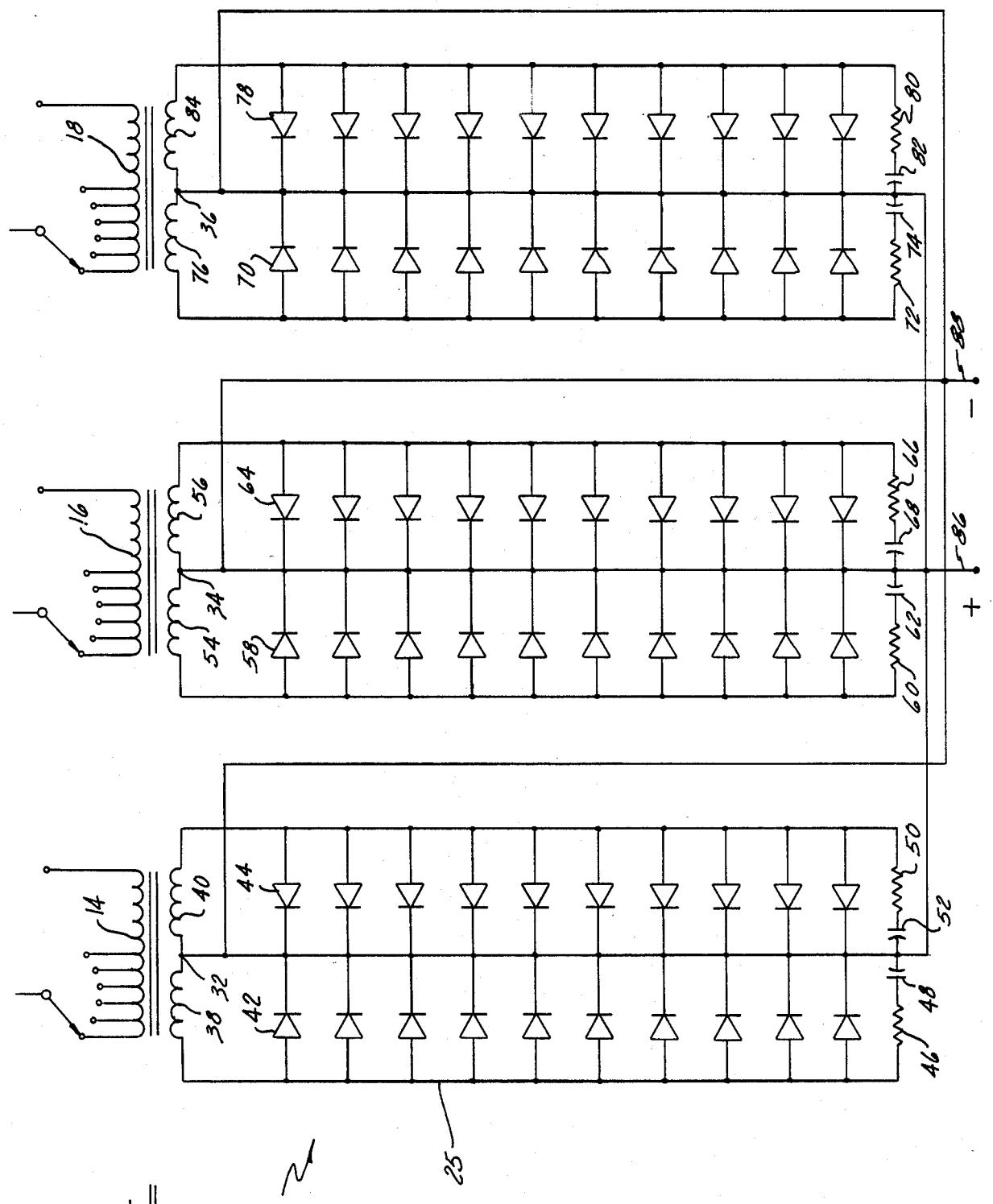
FIG. 4 is a schematic diagram of the transformer primary windings of the primary circuit and the secondary circuit of a three-phase direct current power supply as used either with the prior art primary circuit of FIG. 1 or with the improved primary circuit of FIG. 2.

As shown best in FIG. 2, the primary circuit 10 of a three-phase direct current power supply generally indicated 12, which power supply 12 includes the secondary circuit of FIG. 4, takes advantage of possible parallel current paths in a three-phase direct current power supply, and results in efficiency improvements of such power supply due to lower internal impedance.

In the primary circuit 10 of the power supply 12, as shown in FIG. 2, the three transformer primary windings 14, 16 and 18 are connected at their inner ends in a Y configuration through contactors 20, 22 and 24. At their outer ends, the transformer primary windings are connected to the usual incoming energy phase lines 26, 28 and 30 of a multiphase power line.

Figure 1:
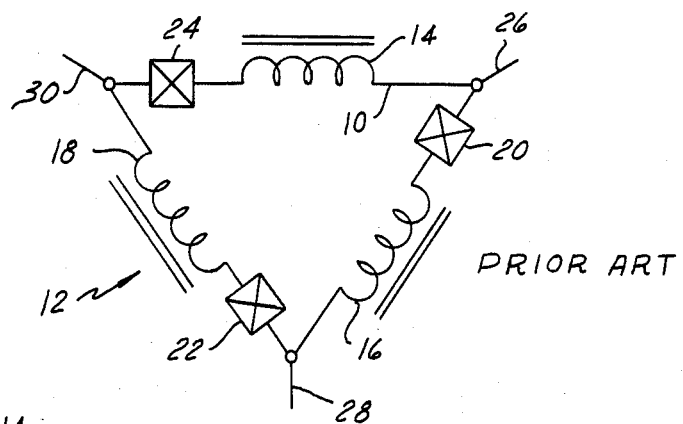
FIG. 1 is a schematic diagram of the primary circuit of a prior art three-phase direct current power supply.

The same elements are shown designated by the same numbers in FIG. 1 in the configuration of the prior art.

In the configuration of FIG. 2, of the invention, any current path, that is, from line 26 to 28, line 28 to 30, or line 30 to 26, must be through two transformer primary windings.

Thus, in the secondary circuit 25 of the power supply 12, as shown in FIG. 4, there are always two diodes sets conducting at any instant of time, with each one conducting one-half of the total output current of the power supply.

As shown in FIG. 4, the secondary windings of the power supply transformers 32,34 and 36 correspond to transformer primary windings 14,16 and 18. The transformer secondary winding 32 is broken into part 38 and part 40 feeding diode sets 42 and 44, respectively. Filter resistance 46 and capacitance 48, respectively, are associated with the diode set 42. Resistance 50 and capacitance 52 are associated with the diode set 44. Similarly, transformer secondary winding 34 is broken up into two separate parts 54 and 56. The part 54 is associated with its diode set 58 and resistance and capacitance 60 and 62, respectively, while the part 56 of the transformer secondary winding 34 is associated with the diode set 64 and resistance 66 and capacitance 68. Diode set 70 and resistance and capacitance 72 and 74 are associated with part 76 of the transformer secondary winding 36, while diode set 78 and resistance 80 and capacitance 82 are associated with the part 84 of the transformer secondary winding 36. As shown in FIG. 4, the multiple sets of diodes are connected together in parallel to provide a substantially direct current output over the conductors 86 and 88.

The effect of the connection of the transformer primary windings 14,16 and 18 as shown in FIG. 2 is to lower the internal impedance of the power supply 12 by splitting the current flow through two parallel paths with identical impedance characteristics in the secondary power supply circuit 25 shown in FIG. 4. Thus, the impedance due to the resistance and inductance of the internal conductors of the power supply between the transformers and the output is reduced by substantially one-half.

In addition, the maximum amount of current obtainable from the power supply 12 without damaging the diodes in the secondary circuit is increased. Because the output current is always shared through two diode groups, the peak current through each diode is reduced by one-half, as compared to the power supply having a primary circuit with the configuration of FIG. 1. This results in a 30% increase in allowable average current through each diode due to a lower peak to average ratio. In other words, the number of diodes needed for a given output current is reduced by 30%.

Another advantage of the power supply primary circuit of FIG. 2 is that the power factor of the direct current power supply is improved. Because each diode set and its associated buses are conducting over a maximum of 120° phase angle of a 60 Hz. three-phase input signal rather than a maximum 60° as would be the case with the primary circuit 10 in the FIG. 1 configuration, the inductive effects of the internal buses in the power supply 12 are reduced. This shows up in the primary circuit 10 of the power supply 12 as an improved power factor. The improved power factor reduces the power line current which reduces the K.V.A. demand of the power supply for a given output current. The reduced K.V.A. allows the use of smaller transformers for a given output current.

Another effect, observed experimentally, is that the power supply of the invention operates quieter and with less vibration than the prior art power supply, as disclosed above. It is hypothesized that such operation is due to the 50% reduction in peak current through internal buses. This lessening of vibration makes fatique failure of brazed junctions in the copper buses less likely.

Improvements in efficiency are largest when the load impedance connected to the direct current power supply is low, that is, 25 microhms or less. As the load impedance rises, the internal impedance of the power supply becomes a smaller fraction of the total circuit impedance and the overall system efficiently improvement becomes less. Inductive impedance in the secondary load has the same effect on the efficiency improvement as resistance.

The reduced vibration and increased allowable average diode current occur regardless of load impedance. That is to say, with the primary power supply circuit of FIG. 2, a direct current power supply can be made to deliver 30% more output current than with the configuration of FIG. 1 without exceeding the average current rating of the diodes.

While one embodiment of the present invention has been considered in detail, it will be understood that other embodiments and modifications are contemplated by the Inventor.

Figure 3:
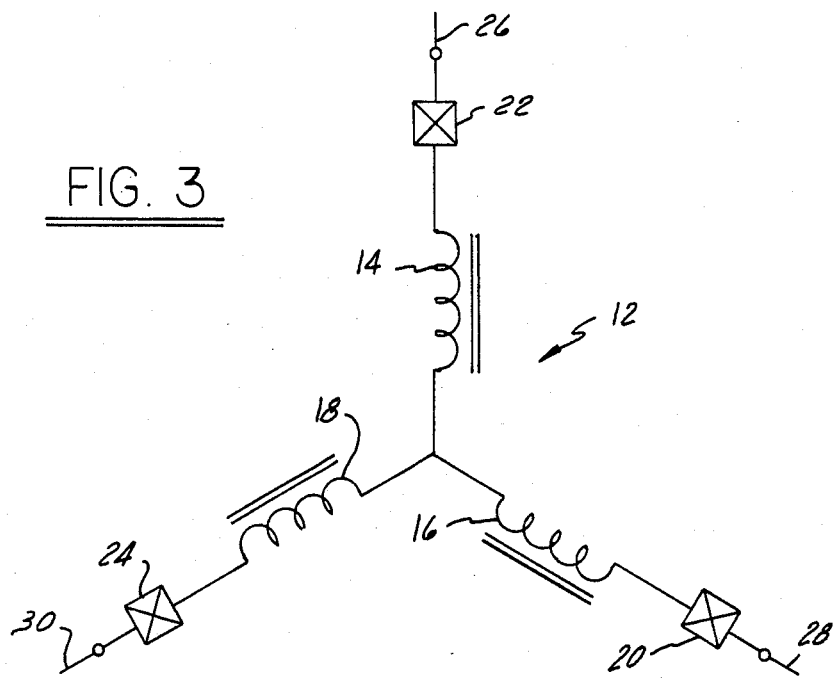
FIG. 3 is a schematic diagram of the primary circuit of another modification of a three-phase direct current power supply constructed in accordance with the invention.

Thus, for example, in the modification of the invention shown in FIG. 3, wherein similar components are given the same reference numbers, the contactors are directly connected to and are in series with the separate phase lines of the incoming power line, the three primary windings of the welding transformers are connected in a simple wye arrangement.

The operation and advantages of the FIG. 3 modification of the invention are substantially the same as the operation and advantages of the FIG. 2 modification of the invention.

It is the intention to include all embodiments and modifications of the invention as are defined by the appended claims within the scope of the invention.

I claim:

1. In a multiphase direct current power supply including separate input energy phase lines, a transformer primary circuit including Y connected transformer primary windings having one, inner end connected together, the other, outer ends of the transformer primary windings being connected to the separate input energy phase lines and means connected in circuit with the primary circuit Y connected transformer primary windings for limiting current conduction through the transformer primary windings to current flowing only through two of the transformer primary windings in series at any one time.

2. Structure as set forth in claim 1, wherein the means for limiting current conduction through the transformer primary windings includes a contactor between each inner transformer primary winding end and adjacent transformer primary winding inner ends.

3. Structure as set forth in claim 1, wherein the means for limiting current conduction through the transformer primary windings includes a contactor connected in series with each transformer primary winding within the branch of the Y connected transformer primary including the transformer primary winding.

4. Structure as set forth in claim 1, wherein the multiphase direct current power supply is a three-phase power supply.

5. Structure as set forth in claim 4, wherein the means for limiting current conduction through the transformer primay windings includes a contactor between each inner transformer primary winding end and adjacent transformer primary winding inner ends.

6. Structure as set forth in claim 4, wherein the means for limiting current conduction through the transformer primary windings includes a contactor connected in series with each transformer primary winding within the branch of the Y connected transformer primary including the transformer primary winding.

7. A three-phase direct current power supply comprising separate input energy phase lines, a primary circuit including Y connected transformer primary windings having inner ends connected together and outer ends connected to the separate input energy phase lines and means connected in circuit with the primary circuit Y connected transformer primary windings for limiting current conduction through the transformer primary windings to current flowing only through two of the transformer primary windings in series at any one time, and a secondary circuit including transformer secondary windings and a plurality of sets of diodes connected to the transformer secondary windings for rectifying electrical energy to provide a direct current output therefrom.

8. Structure as set forth in claim 7, wherein the means for limiting current conduction through the transformer primary windings includes a contactor between each inner transformer primary winding end and adjacent transformer primary winding inner ends.

9. Structure as set forth in claim 7, wherein the means for limiting current conduction through the transformer primary windings includes a contactor connected to each outer transformer primary winding end.

10. Structure as set forth in claim 7, wherein there are six separate diodes connected in parallel with each other.

11. Structure as set forth in claim 10, wherein the separate diodes are individual diodes.

12. Structure as set forth in claim 10, wherein the separate diodes are sets of diodes each set including multiple separate diodes.

13. The method of firing a three-phase direct current power supply having transformer primary windings connected in a Y configuration, wherein the inner ends thereof are connected together and the outer ends are connected to different phases of three-phase input energy, comprising passing the input energy phases through only two transformer primary windings at a time in series with each transformer primary winding being energized for up to 120° of each 360° input energy cycle.

14. The method as set forth in claim 13, wherein the three-phase direct current power supply includes a plurality of parallel diodes in the secondary circuit thereof, and further including the step of passing the power supply secondary current through multiple parallel diodes at all times.

15. The method as set forth in claim 14, wherein the secondary current is passed through two separate parallel diodes at all times.

16. The method as set forth in claim 13, wherein there is a contactor between the inner ends of each transformer primary winding and further including the step of synchronizing the closing of the contactors with the phases of the input energy cycle.

17. The method as set forth in claim 16, and further including the step of synchronizing the closing of the contactors to energize each transformer primary winding for approximately 120° of each 360° input energy cycle.

18. The method as set forth in claim 13, wherein there is a contactor in series with the outer ends of each transformer primary winding and further including the step of synchronizing the closing of the contactors with the phases of the input energy cycle.

19. The method as set forth in claim 18, and further including the step of synchronizing the closing of the contactors to energize each transformer primary winding for approximately 120° of each 360° input energy cycle.

* * * * *